June 26, 1945.　　　M. P. MATUSZAK　　　2,379,022
HYDROFLUORIC ACID PROCESS
Filed May 15, 1943
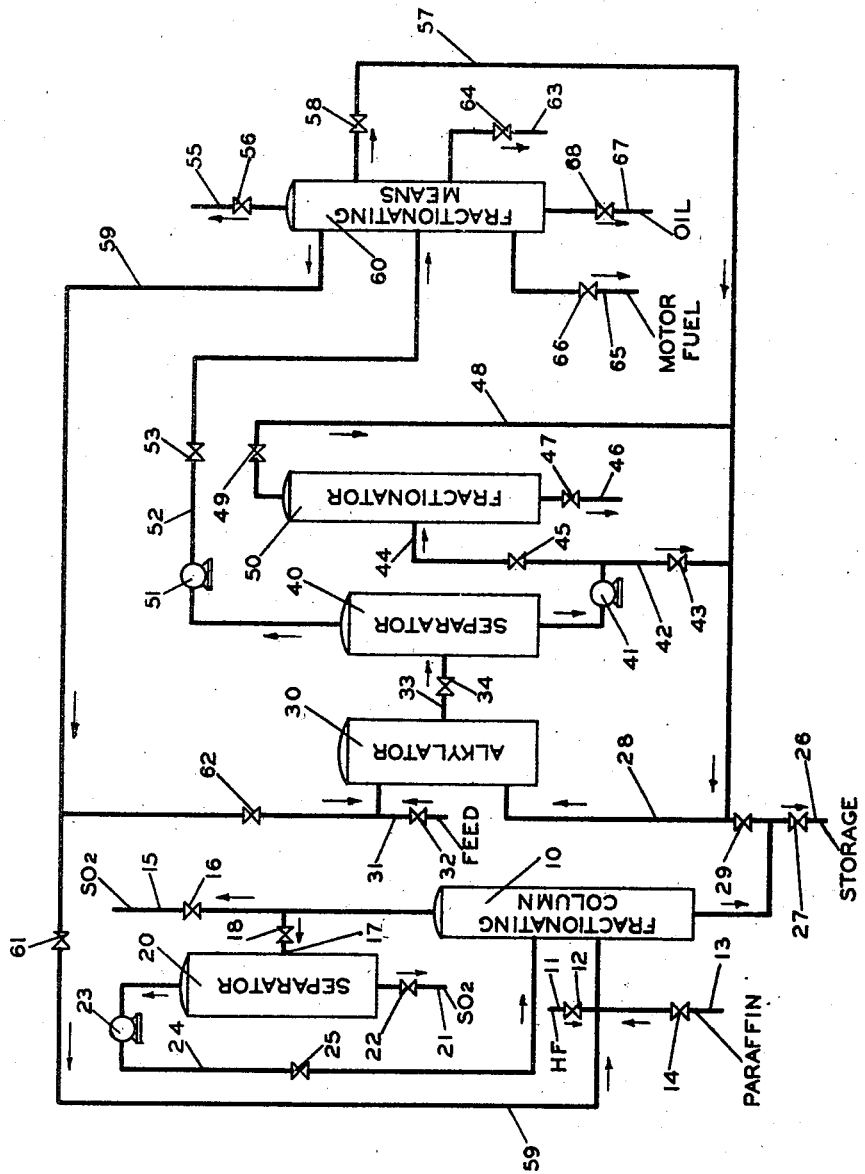
INVENTOR
M.P. MATUSZAK
BY Hudson, Young & Yinger
ATTORNEYS Patented June 26, 1945

2,379,022

UNITED STATES PATENT OFFICE 2,379,022

HYDROFLUORIC ACID PROCESS

Maryan P. Matuszak, Bartlesville, Okla., assignor to Phillips Petroleum Company, a corporation of Delaware Application May 15, 1943, Serial No. 487,143

6 Claims. (Cl. 260—683.4)

This invention relates to a process of purification of hydrofluoric acid, more particularly to the removal of sulfur dioxide.

Hydrofluoric acid, especially in a concentrated or anhydrous form, is an exceedingly useful catalyst for effecting various conversions of organic compounds, among which are alkylation of alkylatable organic compounds, especially aromatic hydrocarbon and non-hydrocarbon compounds and of paraffinic hydrocarbons, with olefins or other alkylating reactants, such as alcohols, esters, alkyl halides, ethers, etc., polymerization of olefins, and reconstruction, isomerization, and/or disproportionation of hydrocarbons. As commercially prepared by the action of concentrated sulfuric acid on fluorspar or fluorite or similar minerals, however, it always contains a small proportion of sulfur dioxide, which in the best grade of commercial anhydrous hydrofluoric acid usually is not more than 0.1 per cent by weight, but sometimes is of the order of 0.5 to 1 per cent or more. The presence of this sulfur dioxide is troublesome and deleterious, since the sulfur becomes concentrated in the product of the catalytic conversion, thereby increasing the corrosiveness of the product, decreasing the octane number and/or lead response of the product (if a motor fuel), and necessitating a considerable expense for desulfurization of the product. For example, it has been repeatedly observed that the product of the alkylation of isobutane with olefins in the presence of a fresh batch of hydrofluoric acid is sour to doctor solution and at times contains enough sulfur to liberate readily detectable proportions of hydrogen sulfide, or even elementary sulfur, when it is distilled, in spite of the fact that comparatively negligible or no sulfur was present in the original hydrocarbon feed stocks. The appearance of excessively high proportions of sulfur in the alkylate has been traced to sulfur dioxide present as an impurity in the hydrofluoric acid used as catalyst.

An object of this invention is to purify hydrofluoric acid by substantially complete removing of sulfur dioxide.

Another object of this invention is to remove sulfur dioxide from hydrofluoric acid by distillation, preferably in the presence of an added paraffin.

Another object is to obtain the advantages of a completely sulfur dioxide-free hydrofluoric acid as a catalyst for the conversion of hydrocarbons.

Other objects and advantages of this invention will be apparent from the accompanying description and discussion.

In accordance with one embodiment of this invention, highly concentrated or substantially anhydrous hydrofluoric acid is subjected to a fractional distillation that removes all traces of sulfur dioxide. Simple fractional distillation in the absence of any added substance may be used, but such simple fractional distillation is relatively time-consuming and relatively inefficient for the removal of the last traces of sulfur dioxide, and at times it results in the loss of considerable hydrofluoric acid that is distilled off with the sulfur dioxide. Hence it is advantageous to effect the distillation in the presence of an added low-boiling paraffin, such as a paraffin of three to five carbon atoms, which forms a minimum-boiling azeotropic mixture with the sulfur dioxide and which has the effect of relatively increasing the efficiency of the fractional distillation. Whenever possible, the added paraffin is preferably one that is subjected to catalytic conversion in the presence of the hydrofluoric acid in a subsequent conversion step, so that, when an excess of the paraffin is used, the excess paraffin need not be removed but instead is carried with the purified hydrofluoric acid to the conversion step. When the conversion step is one of alkylation of a low-boiling alkylatable paraffin, such as isobutane and/or isopentane, the addition of an excess of this paraffin results in presaturation of the hydrofluoric acid alkylation catalyst with the paraffin, in a manner equivalent to that disclosed in my copending application Serial No. 404,395, filed July 28, 1941, of which the present application is considered to be a continuation in part insofar as any common subject matter is concerned. However, in the broad scope of this invention, the resulting sulfur dioxide-free hydrofluoric acid is removable as a product of the purification step herein disclosed, and it may be subsequently used for any purpose whatsoever, as will be understood by those skilled in the art of utilizing hydrofluoric acid. By the practice of my invention it is possible to remove the sulfur dioxide so that it cannot be detected in the resulting purified hydrofluoric acid by ordinary analytical methods, that is, to a concentration not greater than about 0.0001 per cent by weight of the hydrofluoric acid.

An understanding of some aspects of the present invention may be facilitated by the accompanying drawing, which is a schematic exemplifying flow-diagram showing one arrangement of apparatus for practicing the invention. For the sake of concreteness, this flow-diagram is directed specifically to purification of hydrofluoric acid in combination with the alkylation of an alkylatable hydrocarbon in the presence of the resulting purified hydrofluoric acid.

Commercial anhydrous hydrofluoric acid, containing about 0.1 per cent sulfur dioxide by weight, enters fractionating column 10 through inlet 11 controlled by valve 12. A low-boiling paraffin having three to five carbon atoms per molecule is preferably added, as through inlet 13 controlled by valve 14. For the sake of concreteness and simplicity, this paraffin may be taken to be isobutane, which is a low-boiling isoparaffin that is readily alkylatable to motor-fuel hydrocarbons.

By fractional distillation in column 10, the hydrofluoric acid is freed from the sulfur dioxide, which is withdrawn overhead from the column, when no added paraffin is present, through outlet 15 controlled by valve 16. When an added paraffin, such as isobutane, is present the sulfur dioxide is removed as a relatively low-boiling or a minimum-boiling azeotropic mixture with the added paraffin. The composition of the azeotropic mixture varies somewhat with the conditions of operation of column 10. For example, when the distillation is performed under substantially equilibrium conditions, the content of sulfur dioxide in the azeotropic mixture increases from about 55 mol per cent at about 0° C. to about 65 mol per cent at about 100° C. Since distillation under equilibrium conditions is not necessary, ordinarily the content of sulfur dioxide generally is somewhat less than these values; and the distillation is advantageously carried on more rapidly than would be possible if the mixture going overhead were limited to the exact composition of the azeotropic mixture for the temperature at the top of column 10. In such distillation, the overhead effluent from column 10 at times contains some hydrofluoric acid, since hydrofluoric acid also forms low-boiling or minimum-boiling azeotropic mixtures with paraffins having three to five carbon atoms per molecule. However, since the paraffin-hydrofluoric acid azeotropes are higher-boiling than the paraffin-sulfur dioxide azeotropes, and since any vaporized hydrofluoric acid is positively diluted by the paraffin, the proportion of hydrofluoric acid in the overhead effluent from column 10 is much less than that characteristic of distillation in the absence of an added paraffin; consequently, the loss of hydrofluoric acid in the overhead effluent is advantageously decreased when addition of a paraffin is practiced.

Although the resulting paraffin-sulfur dioxide overhead effluent may be withdrawn through outlet 15, it is usually preferably passed through conduit 17 controlled by valve 18 to separator 20, in which it is cooled sufficiently to condense and separate it into two liquid phases under the influence of gravity and/or centrifugation. The temperature of the mixture in separator 20 must be below the critical solution temperature, and the separation is improved as the temperature is decreased below the critical solution temperature. The optimum temperature decreases with decrease in the molecular weight of the added paraffin, being in the range of approximately −15 to −30° C. for a butane and being about 10° C. lower and higher for propane and pentane, respectively; it may be readily determined for any particular instance by trial. The lower or denser phase in separator 20 is primarily sulfur dioxide having in solution only a minor proportion of added paraffin and possibly a trace or generally negligible proportion of hydrofluoric acid; it is withdrawn from the process through outlet 21 controlled by valve 22. The upper or lighter phase in separator 20 is primarily added paraffin having in solution only a minor proportion of sulfur dioxide and a smaller proportion of hydrofluoric acid; it is returned as reflux to column 10 by pump 23 through conduit 24 controlled by valve 25.

If desired, the proportion of paraffin added to column 10 may be so adjusted that pure hydrofluoric acid, free from both sulfur dioxide and added paraffin, is withdrawn as a kettle product to storage through outlet 26 controlled by valve 27. When some paraffin material is not deleterious to the hydrofluoric acid, as when the added paraffin is one taking part in a subsequent conversion step, however, it is preferable to add an excess of the paraffin, so that the hydorfluoric acid leaving column 10 is substantially saturated with dissolved paraffin. The maximum proportion of paraffin that can be dissolved in the hydrofluoric acid depends upon the temperature, as is illustrated by the fact that the solubility of liquid isobutane in liquid hydrofluoric acid increases practically linearly with increase in temperature from 1.8 per cent by weight at 0° C. to 4.0 per cent at 60° C. When the sulfur dioxide-freed hydrofluoric acid is to be used as a catalyst in the catalytic alkylation of isobutane, it is passed, together with dissolved isobutane, through conduit 28 controlled by valve 29 to alkylator 30; when its temperature is higher than is desired for the alkylation, it may be cooled in a cooler, not shown, before passing into alkylator 30.

In alkylator 30, the hydrofluoric acid containing dissolved isobutane is intimately mixed with a hydrocarbon feed suitable for the desired alkylation that enters the alkylator through inlet 31 controlled by valve 32. This feed is commonly a mixture comprising the alkylatable hydrocarbon, such as isobutane, and the alkylation reactant, such as one or more olefins, preferably olefins of three to five carbon atoms per molecule, further preferably butylenes, and still further preferably isobutylene; in addition, the feed generally comprises one or more incidentally present and relatively inert hydrocarbons, such as propane and normal butane. The reaction conditions in alkylator 30 are selected with due regard to the optimum economical production of high-quality alkylate. The instantaneous concentration of alkylating reactant should be low, whereas that of the alkylatable hydrocarbon should be high, in order to minimize undesired side reactions. In practice, the over-all mol ratio of isobutane entering the process and being recycled to butylene is usually between 4:1 and 10:1; it is preferably as high as is economically obtainable. In the reaction zone itself the mol ratio of isobutane to butylene is much higher, preferably well over 100:1. The volume ratio of hydrofluoric acid to hydrocarbons should be in the range of 0.5:1 to 2:1; it is generally in the neighborhood of 1:1, which is preferred. The temperature generally may be in a rather broad range, such as 0 to 70° C., but in the particular embodiment under consideration, it is preferably in the range of 50 to 70° C., to minimize the expense of cooling the hydrofluoric acid from column 10. Cooling of the reaction zone is usually desirable and may be effected indirectly with water. The pressure is preferably sufficient to maintain all components of the reaction mixture in the liquid phase, but an unusually high pressure is not necessary. The reaction time, or time of residence of the reaction mixture in alkylator 30, may be between about 1 and 30 minutes, preferably between 3 and 15 minutes.

After a suitable reaction period, the reaction mixture passes from alkylator 30 through conduit 33 controlled by valve 34 to separator 40, in which it is separated by gravity and/or centrifugation, preferably aided by cooling to a temperature in the range of 30 to 40° C., or lower, into a hydrofluoric acid liquid phase and a hydrocarbon liquid phase. The hydrofluoric acid phase is recycled by pump 41 through conduit 42 controlled by valve 43 to alkylator 30. Usually, at least a part of this phase is preferably passed through conduit 44 controlled by valve 45 to fractionator 50, wherein it is purified by being distilled from a heavy acid-soluble oil, which is withdrawn through outlet 46 controlled by valve 47. The purified hydrofluoric acid, accompanied by isobutane that was dissolved in the acid, is passed through conduit 48 controlled by valve 49 to alkylator 30.

The hydrocarbon phase separated in separator 40 is pumped by pump 51 through conduit 52 controlled by valve 53 to fractionating means 60, which generally consists of several fractionating columns and appropriate auxiliary equipment as will be understood by those skilled in the art of distilling materials. The hydrocarbon mixture is fractionally distilled in means 60 into several fractions, as may be desired, such as the following: (1) a minor fraction, comprising chiefly light gases having less than four carbon atoms per molecule, which is withdrawn through outlet 55 controlled by valve 56; (2) a fraction, comprising chiefly isobutane and hydrofluoric acid, which is recycled through conduit 57 controlled by valve 58 to alkylator 30; (3) a major fraction, comprising chiefly acid-free isobutane, which is recycled through conduit 59 to fractionating column 10 and/or alkylator 30 in proportions controlled by valves 61 and 62; (4) a fraction, comprising chiefly normal butane, which is withdrawn through outlet 63 controlled by valve 64; (5) a motor-fuel fraction, comprising chiefly the gasoline-range paraffins formed by the alkylation, which is withdrawn as a product through outlet 65 controlled by valve 66; and (6) a minor oil fraction, comprising chiefly hydrocarbons boiling above the gasoline range, which is withdrawn through outlet 67 controlled by valve 68.

It will be understood that the drawing is schematic and that additional equipment well-known in the art may be used to facilitate obtaining effects that have been indicated.

Some aspects of the invention are further illustrated by the following example, which should not be used to restrict the invention unduly.

Example

Shortly after a commercial plant for the hydrofluoric acid alkylation of isobutane with olefins, principally butylenes, was placed into operation, it was found that the alkylate contained 0.0253 per cent sulfur by weight, was sour to doctor solution, and had a relatively poor lead response. The total hydrocarbon feed to the alkylation unit had the following composition, in per cent by liquid volume:

| | |
|---|---|
| Propane | 10.8 |
| Isobutane | 33.9 |
| Butylene and propylene | 5.1 |
| Normal butane | 50.1 |
| Pentane | 0.1 |
| Total | 100.0 |

This feed contained only 0.0005 per cent by weight of sulfur. The residence time of the hydrocarbon phase in the alkylation zone was 10 minutes; the reaction temperature was 32° C. The ratio of hydrofluoric acid to hydrocarbons in the reactor was approximately 1:1 by volume. The composition of the hydrofluoric acid used as catalyst is indicated by the following typical analysis, in per cent by weight:

| | |
|---|---|
| Hydrogen fluoride | 98.7 |
| Sulfur dioxide | 0.070 |
| Fluosilicic acid | 0.28 |
| Sulfuric acid | 0.008 |
| Water | 0.25 |
| Unaccounted for | 0.692 |
| Total | 100.000 |

In contrast, when the catalyst is preliminarily freed from sulfur dioxide by distillation in the presence of added isobutane, the alkylate is sweet to doctor solution and usually contains less than about 0.0005 per cent of sulfur; and the lead response of the alkylate is comparatively much better.

The invention may be practiced otherwise than as specifically described or illustrated herein, and many modifications within the scope and spirit of it will be obvious to those skilled in the art, in the light of the present disclosure and discussion.

I claim:

1. The process of removing essentially all the sulfur dioxide which is associated with concentrated hydrofluoric acid as an impurity, which comprises subjecting said impure hydrofluoric acid to distillation in the presence of a low-boiling paraffin hydrocarbon having at least three and not more than five carbon atoms per molecule to remove as a low-boiling fraction a mixture of said paraffin and sulfur dioxide and containing essentially all the sulfur dioxide contained as an impurity in said hydrofluoric acid.

2. A process for removing sulfur dioxide from anhydrous hydrofluoric acid containing same as an impurity in an amount substantially greater than 0.0001 per cent by weight, which comprises subjecting such hydrofluoric acid to fractional distillation in the presence of a paraffin hydrocarbon having at least three and not more than five carbon atoms per molecule in an amount in excess of that required to form an azeotropic mixture with the sulfur dioxide present, and removing as a kettle product of said distillation hydrofluoric acid containing less than 0.0001 per cent by weight of sulfur dioxide.

3. The process of claim 1 in which said low-boiling paraffin hydrocarbon is a butane.

4. The process of claim 2 in which said low-boiling paraffin hydrocarbon is a butane.

5. In a process for alkylating a low-boiling isoparaffin with an olefin in the presence of a hydrofluoric acid alkylation catalyst, in which an unreacted isoparaffin fraction is separated from the alkylation effluent and recycled to the alkylation, the improvement which comprises passing sulfur dioxide-contaminated hydrofluoric acid to a fractional distillation, passing a portion of said recycled isoparaffin fraction to said fractional distillation in an amount at least sufficient to form a minimum-boiling azeotropic mixture with all of said sulfur dioxide and to have an excess dissolved in liquid hydrofluoric acid removed from said distillation as a kettle product, removing from said distillation as an overhead product a mixture comprising sulfur dioxide and said isoparaffin, removing from said distillation as a kettle product liquid hydrofluoric acid essentially free from sulfur dioxide and containing dissolved isoparaffin, and passing said kettle product to said alkylation as a portion of the alkylation catalyst.

6. A process for alkylating a low-boiling alkylatable paraffin hydrocarbon with an alkylating reactant in the presence of concentrated hydrofluoric acid and avoiding contamination of the alkylate by sulfur compounds resulting from sulfur dioxide present as an impurity in make-up hydrofluoric acid catalyst, which comprises reacting an alkylatable low-boiling paraffin hydrocarbon and an alkylating reactant under alkylation conditions in the presence of essentially sulfur-free hydrofluoric acid as alkylation catalyst, separating from effluents of said alkylation a fraction comprising unreacted alkylatable paraffin hydrocarbons, recycling a portion of said fraction to said alkylation, passing sulfur dioxide-contaminated hydrofluoric acid from an extraneous source to fractional distillation means, passing also to said means a further portion of the aforesaid unreacted paraffin fraction, removing as an overhead product from said means a mixture comprising sulfur dioxide and low-boiling paraffin hydrocarbons, removing as a kettle product from said means substantially pure sulfur dioxide-free hydrofluoric acid and passing same to said alkylation.

MARYAN P. MATUSZAK.